United States Patent
Xiao

(10) Patent No.: US 11,336,105 B2
(45) Date of Patent: May 17, 2022

(54) MULTI-BATTERY CHARGING AND DISCHARGING DEVICE AND MOBILE TERMINAL

(71) Applicant: VIVO MOBILE COMMUNICATION CO., LTD., Guangdong (CN)

(72) Inventor: Shiwen Xiao, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/156,845

(22) Filed: Jan. 25, 2021

(65) Prior Publication Data

US 2021/0175731 A1   Jun. 10, 2021

Related U.S. Application Data

(63) Continuation of application No. PCT/CN2019/097218, filed on Jul. 23, 2019.

(51) Int. Cl.
*H02J 7/00* (2006.01)

(52) U.S. Cl.
CPC .......... *H02J 7/0068* (2013.01); *H02J 7/0013* (2013.01); *H02J 7/0047* (2013.01)

(58) Field of Classification Search
CPC ....... H02J 7/0068; H02J 7/0013; H02J 7/0047
See application file for complete search history.

(56) References Cited

U.S. PATENT DOCUMENTS

| 5,479,083 A * | 12/1995 | Brainard | H01M 10/0413 320/121 |
|---|---|---|---|
| 2007/0090799 A1 | 4/2007 | Lee et al. | |
| 2010/0253286 A1 | 10/2010 | Sutardja | |
| 2013/0335026 A1 | 12/2013 | Reynolds et al. | |

(Continued)

FOREIGN PATENT DOCUMENTS

| CN | 103178581 A | 6/2013 |
|---|---|---|
| CN | 104505890 A | 4/2015 |

(Continued)

OTHER PUBLICATIONS

International Search Report and Written Opinion of the International Searching Authority regarding International Patent Application No. PCT/CN2019/097218, dated Oct. 24, 2019. Translation provided by Bohui Intellectual Property.

(Continued)

*Primary Examiner* — Carlos Amaya

(74) *Attorney, Agent, or Firm* — Harness, Dickey & Pierce, P.L.C.

(57) ABSTRACT

A multi-battery charging and discharging device including a power management integrated circuit (PMIC) module, at least two rechargeable batteries, and a plurality of first field-effect transistors. Each rechargeable battery is connected to a pulse width modulation (PWM) power module of the PMIC module through a field-effect switching transistor, terminals for connecting field-effect switching transistors and the PWM power module are separated from each other. Each of the first field-effect transistors is provided in a connection path between each rechargeable battery and a load. The first field-effect transistor is used to control the connection path between the rechargeable battery and the load to be turned on or turned off.

10 Claims, 10 Drawing Sheets

(56) References Cited

U.S. PATENT DOCUMENTS

2015/0295424 A1     10/2015   Suzuki
2018/0019607 A1      1/2018   Lee et al.

FOREIGN PATENT DOCUMENTS

| | | |
|---|---|---|
| CN | 104769808 A | 7/2015 |
| CN | 106712207 A | 5/2017 |
| CN | 106716771 A | 5/2017 |
| CN | 206759070 U | 12/2017 |
| CN | 107895982 A | 4/2018 |
| CN | 108899952 A | 11/2018 |
| GB | 2292845 A | 3/1996 |
| KR | 1020060109048 A | 10/2006 |

OTHER PUBLICATIONS

First Office Action regarding Chinese Patent Application No. 201810826095.0, dated Dec. 13, 2019. Translation provided by Bohui Intellectual Property.

Second Office Action regarding Chinese Patent Application No. 201810826095.0, dated Aug. 5, 2020. Translation provided by Bohui Intellectual Property.

Supplementary European Search Report regarding International Patent Application No. EP19840448.5, PCT/CN2019097218, dated Jul. 15, 2021.

Research on the Performance of PWM controlled switching power supply, Power Electronics Technology, ISBN 978-7-83002-474-1, pp. 266-268, Jul. 2017. Translation provided by Bohui Intellectual Property.

\* cited by examiner

MULTI-BATTERY CHARGING AND DISCHARGING DEVICE AND MOBILE TERMINAL

CROSS-REFERENCE TO RELATED APPLICATIONS

This application is a Bypass Continuation Application of PCT/CN2019/097218 filed on Jul. 23, 2019, which claims priority to Chinese Patent Application No. 201810826095.0 filed on Jul. 25, 2018, which are incorporated herein by reference in their entirety.

TECHNICAL FIELD

The present disclosure relates to the field of charging power supplies, and in particular, to a multi-battery charging and discharging device and a mobile terminal.

BACKGROUND

At present, with a rapid development of mobile communication technologies, mobile terminals (e.g., smart phones) have become indispensable electronic consumer products in daily life of people. As the smart phones become more and more popular, and functions of the smart phones are continuously upgraded and optimized, the smart phones have been integrated into various aspects of life, and users often use the smart phones on various occasions and in various places.

SUMMARY

In a first aspect, some embodiments of the present disclosure provide a multi-battery charging and discharging device. The multi-battery charging and discharging device includes a power management integrated circuit (PMIC) module, at least two rechargeable batteries, and a plurality of first field-effect transistors.

Each rechargeable battery is connected to a pulse width modulation (PWM) power module in the PMIC module through a field-effect switching transistor, terminals for connecting field-effect switching transistors and the PWM power module are separated from each other.

Each of the first field-effect transistors is provided in a connection path between a rechargeable battery and a load. The first field-effect transistor is used to control the connection path between the rechargeable battery and the load to be turned on or turned off.

In a second aspect, some embodiments of the present disclosure provide a mobile terminal. The mobile terminal includes at least one load and the multi-battery charging and discharging device according to the first aspect.

The multi-battery charging and discharging device is used to supply power to the at least one load.

BRIEF DESCRIPTION OF THE DRAWINGS

In order to describe technical solutions in embodiments of the present disclosure or the related art more clearly, accompanying drawings to be used in the description of the embodiments of the present disclosure will be briefly introduced below. Obviously, the accompanying drawings in the following description are merely some embodiments of the present disclosure, and a person of ordinary skill in the art may obtain other drawings according to these drawings without paying any creative effort.

DETAILED DESCRIPTION

Figure 1:
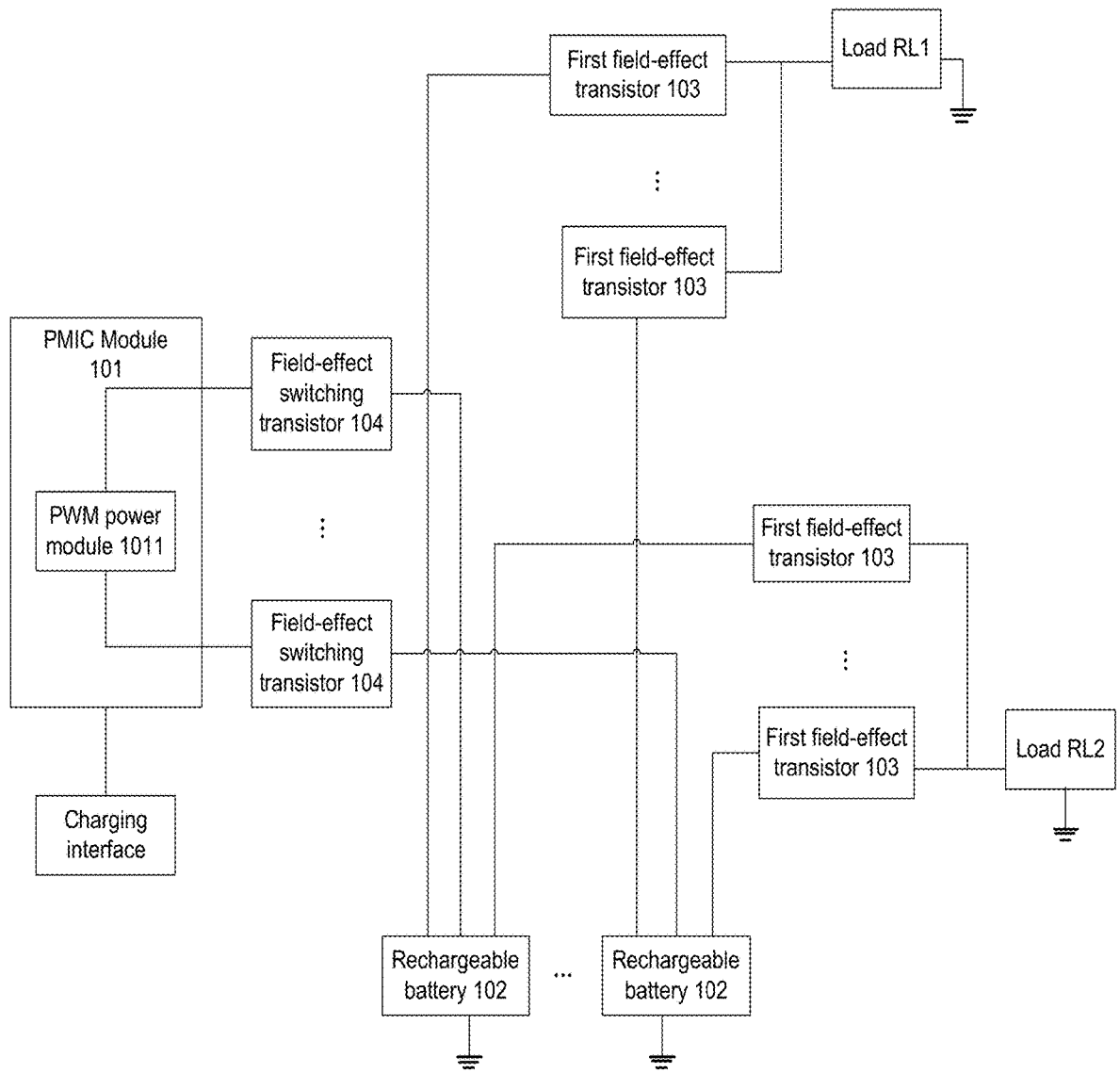
FIG. 1 is a schematic diagram showing a structure of a multi-battery charging and discharging device, in accordance with some embodiments of the present disclosure.

In order to enable a person skilled in the art to better understand technical solutions in the present disclosure, the technical solutions in embodiments of the present disclosure will be described below clearly and completely with reference to the accompanying drawings in the embodiments of the present disclosure. Obviously, the described embodiments are merely some but not all embodiments of the present disclosure. All other embodiments obtained on a basis of the embodiments of the present disclosure by a person of ordinary skill in the art without paying any creative effort shall be included in the protection scope of the present disclosure.

As a display screen of a mobile terminal become larger and larger, functions of the mobile terminal become stronger and stronger, and a processing rate of a central processing unit (CPU) becomes faster and faster, power consumption of the mobile terminal increases sharply. Therefore, requirements on battery life are getting higher and higher, and requirements on power supply time of a power supply are getting higher and higher. In order not to affect standby time of the mobile terminal, a capacity of a battery equipped in the mobile terminal will also become larger and larger. However, due to an increase in the capacity of the battery, charging time of the battery is increased, thereby reducing user experience in charging. Therefore, in order to ensure that the charging time of the battery is not increased and the battery life is prolonged, a multi-battery parallel charging power supply is provided. That is to say, multiple rechargeable batteries connected in parallel supply power to electrical loads of the mobile terminal. However, since the multiple batteries are connected in parallel, when a difference between resistances of the rechargeable batteries is large, there is a certain voltage difference between the rechargeable batteries, which may cause a phenomenon that a rechargeable battery with a large voltage charges a rechargeable battery with a small voltage, that is, a problem of current backflow occurs between the multiple batteries.

It will be seen that, in a multi-battery charging and discharging device provided by the related art, when the difference between the resistances of the rechargeable batteries is large, the problem of current backflow occurs between the multiple batteries, which not only shortens the power supply time of the power supply, but also causes certain damage to the rechargeable batteries, thereby shortening a service life of the rechargeable batteries.

Some embodiments of the present disclosure provide a multi-battery charging and discharging device and a mobile terminal. Each rechargeable battery is equipped with a field-effect switching transistor, and terminals for connecting field-effect switching transistors and a pulse width modulation (PWM) power module are separated from each other, so as to prevent a phenomenon of current backflow between batteries in a charging process. Moreover, a unidirectional conductive field-effect transistor is provided in a connection path between the rechargeable battery and any load to prevent the phenomenon of current backflow between the batteries in a discharging process, thereby avoiding affecting a service life of the batteries due to the current backflow between the batteries, providing technical support for achieving charging and discharging of the multiple batteries, and prolonging standby time of the mobile terminal in which the device is used as a power supply.

In some embodiments of the present disclosure, the mobile terminal includes, but is not limited to, a mobile phone, a tablet computer, a notebook computer, a palm computer, a vehicle-mounted terminal, and a wearable device. The embodiments of the present disclosure are described by taking a common smart phone as an example.

FIG. 1 is a schematic diagram of a multi-battery charging and discharging device, in accordance with some embodiments of the present disclosure. As shown in FIG. 1, the charging and discharging device includes a power management integrated circuit (PMIC) module 101, at least two rechargeable batteries 102, and first field-effect transistors 103.

Each rechargeable battery 102 is connected to the PWM power module 1011 of the PMIC module 101 through a field-effect switching transistor 104, and the terminals of the field-effect switching transistors 104 connected to the PWM power module 1011 are separated from each other, that is, access terminals of the field-effect switching transistors 104 connected to the PWM power module 1011 are separated from each other. Therefore, when the field-effect switching transistors 104 are all closed, access terminals of the rechargeable batteries 102 connected to the PWM power module 1011 are separated from each other, so that rechargeable batteries 102 in a charging circuit that uses the PWM power module 1011 to control charging are not directly connected in parallel, thereby avoiding the phenomenon of current backflow between the rechargeable batteries 102 in the charging process.

A connection path between each rechargeable battery 102 and a load is provided with a first field-effect transistor 103. The first field-effect transistor 103 is used to control the connection path between the rechargeable battery 102 and the load to be turned off or turned on. For example, in a case where a voltage difference between the rechargeable batteries 102 is greater than a preset threshold, a first field-effect transistor 103 connected to a rechargeable battery 102 with a large voltage value satisfies a forward turn-on condition. In this case, the rechargeable battery 102 with the large voltage value supplies power to the load, and an input voltage of the first field-effect transistor 103 that is connected to the rechargeable battery 102 with a small voltage value is a reverse voltage, so the first field-effect transistor 103 that is connected to the rechargeable battery 102 with a small voltage value is in a turn-off state. In this case, a connection path between the rechargeable battery 102 with the small voltage value and the load is turned on, so that rechargeable batteries 102 in a discharging circuit that uses multiple rechargeable batteries to supply power to loads are not directly connected in parallel, thereby avoiding the phenomenon of current backflow between the rechargeable batteries 102 in the discharging process.

For example, the PMIC module 101 refers to a power management integrated circuit, which is mainly used to manage a power device in a host system, and is commonly used in mobile phones and various mobile terminal devices. The PWM power module 1011 refers to a pulse width modulation power module, and the field-effect switching transistors 104 are closed or opened under the control of the PMIC module 101. The first field-effect transistor 103 has a unidirectional conductivity characteristic, in a case where an input voltage of the first field-effect transistor 103 satisfies the forward turn-on condition, the first field-effect transistor 103 is automatically switched to a turn-on state, and in a case where the input voltage of the first field-effect transistor 103 does not satisfy the forward turn-on condition, the first field-effect transistor 103 is in a turn-off state.

It will be noted that, FIG. 1 shows an example in which the multi-battery charging and discharging device supplies power to two loads, i.e., a load RL1 and a load RL2. Multiple rechargeable batteries in the multi-battery charging and discharging device supply power to the load RL1 and the load RL2 to enable the load RL1 and the load RL2 to operate normally.

For a smart phone, the load RL1 includes basic functional modules of the terminal, such as a CMOS camera module (CCM), a fingerprint module, a liquid crystal display module (LCM), an audio power amplifier, a touch screen, or an infrared sensor. The load RL2 includes: a second-generation (2G) power amplifier (PA), a third-generation (3G) PA, a fourth-generation (4G) PA, or a PA radio frequency power amplifier power management module (PAPM).

In some embodiments of the present disclosure, each rechargeable battery 102 is equipped with a field-effect switching transistor 104, and the terminals of the field-effect switching transistors 104 connected to the PWM power module 1011 are separated from each other, so as to prevent the phenomenon of current backflow between the batteries in the charging process. Moreover, a unidirectional conductive field-effect transistor is provided in a connection path between the rechargeable battery and any load to prevent the phenomenon of current backflow between the batteries in the discharging process, thereby avoiding affecting the service life of the batteries due to the current backflow between the batteries, providing the technical support for achieving the charging and discharging of the multiple batteries, and further shortening time required for charging, prolonging the standby time of the mobile terminal in which the device is used as the power supply, and improving user experience.

Figure 2A:
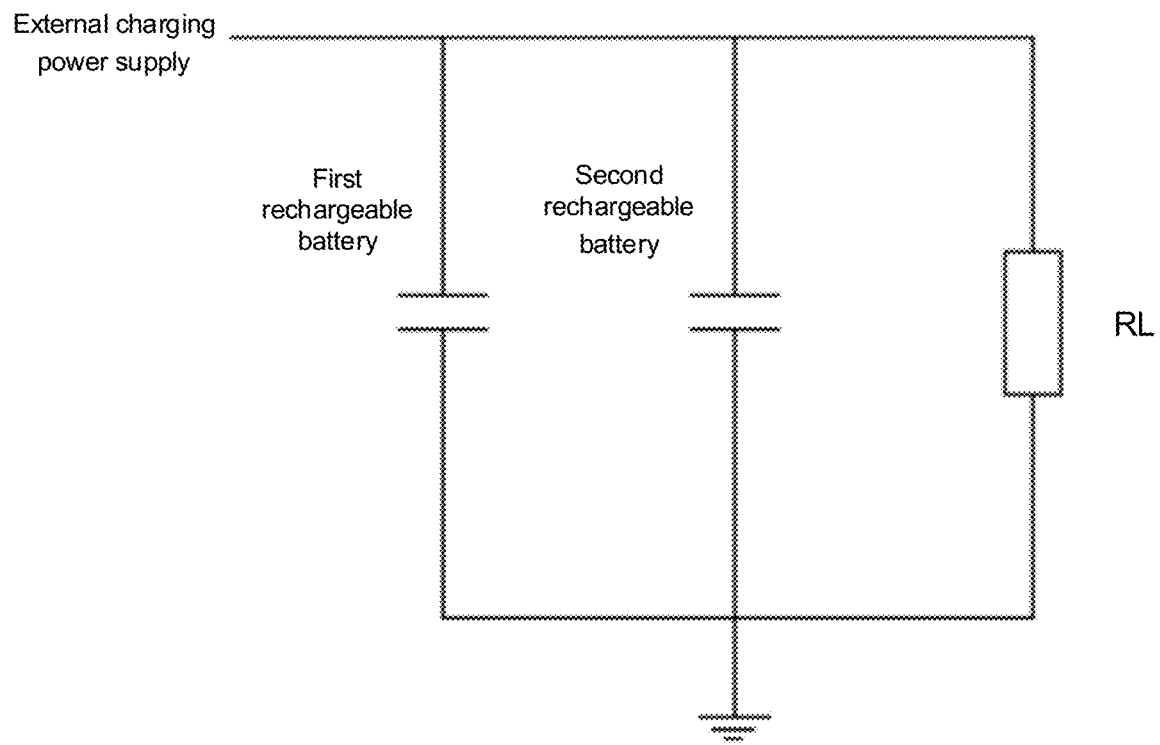
FIG. 2a is a schematic diagram of a parallel charging and discharging circuit of two rechargeable batteries, in accordance with some embodiments of the present disclosure.

For example, as shown in FIG. 2a, one terminal of a first rechargeable battery and one terminal of a second rechargeable battery are both grounded; and the other terminal of the first rechargeable battery and the other terminal of the second rechargeable battery are connected, and are connected to an external charging power supply. For a discharging process of the rechargeable batteries, the first rechargeable battery and the second rechargeable battery are connected in parallel to supply power to the loads RL.

Figure 2B:
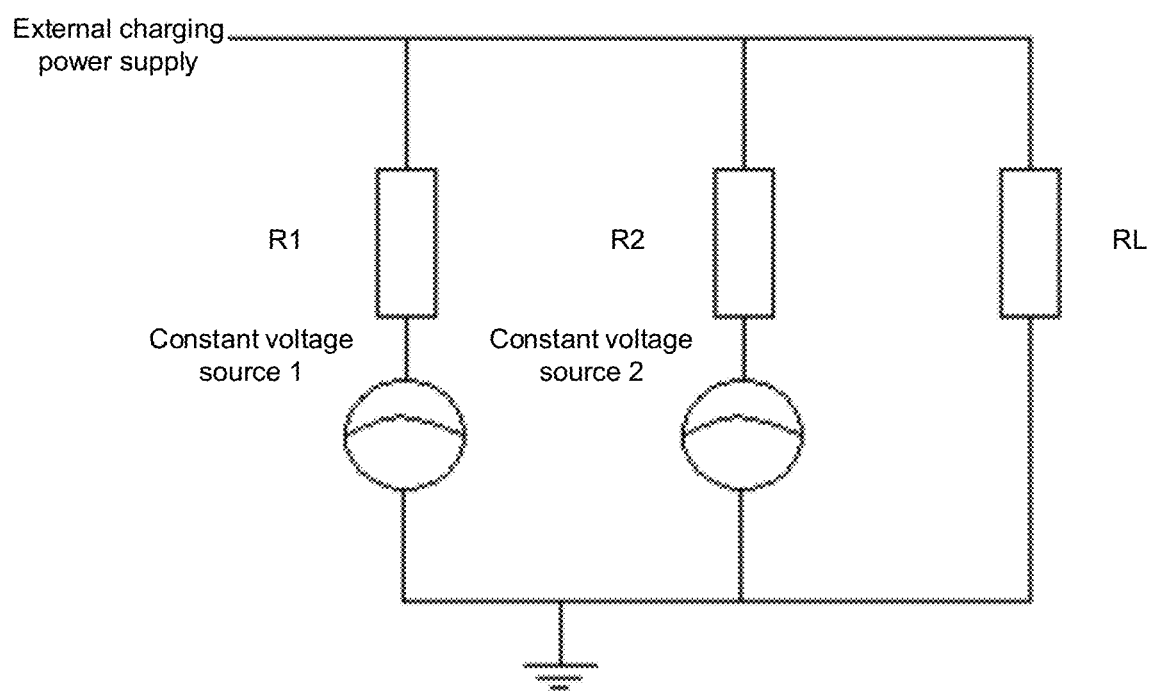
FIG. 2b is a schematic equivalent circuit diagram of a parallel charging and discharging circuit of two rechargeable batteries, in accordance with some embodiments of the present disclosure.

FIG. 2b shows an equivalent circuit of the charging and discharging circuit shown in FIG. 2a. Each rechargeable battery is equivalent to an internal resistor and a constant voltage source. That is, the first rechargeable battery is equivalent to an internal resistor R1 and a constant voltage source 1, and the second rechargeable battery is equivalent to an internal resistor R2 and a constant voltage source 2.

For example, an initial value of the internal resistor R1 and an initial value of the internal resistor R2 are both 100 milliohms. With charging and discharging of the rechargeable batteries, if the internal resistor R2 corresponding to the second rechargeable battery is increased to 250 milliohms, and the internal resistor R1 corresponding to the first rechargeable battery is unchanged and is still 100 milliohms; in this case, in a process of charging the first rechargeable battery and the second rechargeable battery by the external charging power supply, since the internal resistor R2 is greater than the internal resistor R1, a charging current flowing through the second rechargeable battery is smaller than a charging current flowing through the first rechargeable battery, and further a voltage of the second rechargeable battery rises slowly, and a voltage of the first rechargeable battery rises quickly.

When the voltage of the first rechargeable battery is greater than the voltage of the second rechargeable battery by a preset value (e.g., 0.25 V), the first rechargeable battery discharges the second rechargeable battery while being charged, and a discharge current (i.e., a backflow current) is a quotient of a voltage difference between the first rechargeable battery and the second rechargeable battery divided by the internal resistor R2 (the load RL being not considered, and the load RL being much greater than the internal resistor of the battery, e.g., 0.25 V/250 milliohms=1 A), which affects the service life of the first rechargeable battery.

Based on the phenomenon of current backflow between the rechargeable batteries, in some embodiments of the present disclosure, the unidirectional conductivity characteristic of the unidirectional conductive field-effect transistor is fully utilized, so that in the case where the voltage difference between the rechargeable batteries is greater than the preset threshold, a unidirectional conductive field-effect transistor connected to one rechargeable battery is in a turn-on state, and a unidirectional conductive field-effect transistor connected to the other rechargeable battery is in a turn-off state, that is, in a case where internal resistor(s) of one or more batteries in the charging and discharging device are changed, automatic switching between the turn-on state and the turn-off state is achieved due to the unidirectional conductivity characteristic of the unidirectional conductive field-effect transistor. As a result, it is possible to avoid a situation where positive electrodes and negative electrodes of the multiple rechargeable batteries are directly connected in parallel, and even if the voltage difference between the rechargeable batteries is greater than the preset threshold, the phenomenon of current backflow does not occur.

Figure 3A:
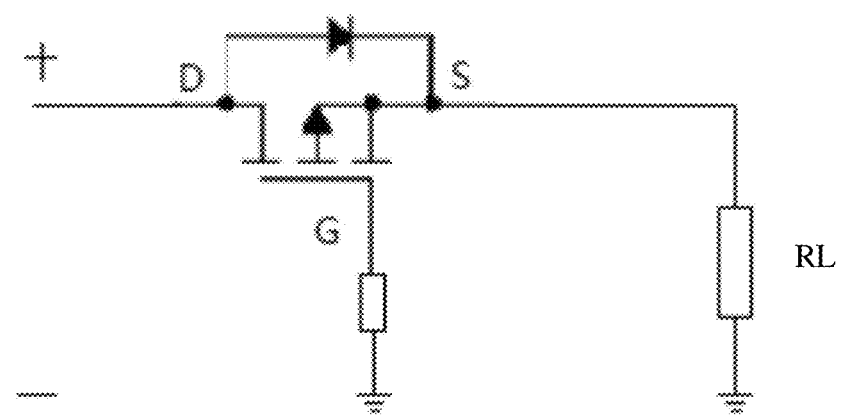
FIG. 3a is a schematic diagram of a unidirectional conductive field-effect transistor in a multi-battery charging and discharging device, in accordance with some embodiments of the present disclosure.

As shown in FIG. 3a, in a case where an input voltage of the unidirectional conductive field-effect transistor is a forward voltage and a value of the voltage is greater than a forward turn-on voltage; a diode inside the unidirectional conductive field-effect transistor is turned on first, and $V_{GS}$ is a negative voltage. Based on a parameter table of the unidirectional conductivity characteristic of the unidirectional conductive field-effect transistor, it will be seen that, when $V_{GS}$ of the unidirectional conductive field-effect transistor is a negative voltage and reaches a certain threshold (which ranges from −1.0 V to −2.5 V), the unidirectional conductive field-effect transistor is conductive between a D electrode and an S electrode thereof. At this time, the unidirectional conductive field-effect transistor satisfies the unidirectional turn-on condition. Therefore, the unidirectional conductive field-effect transistor is in the turn-on state.

Figure 3B:
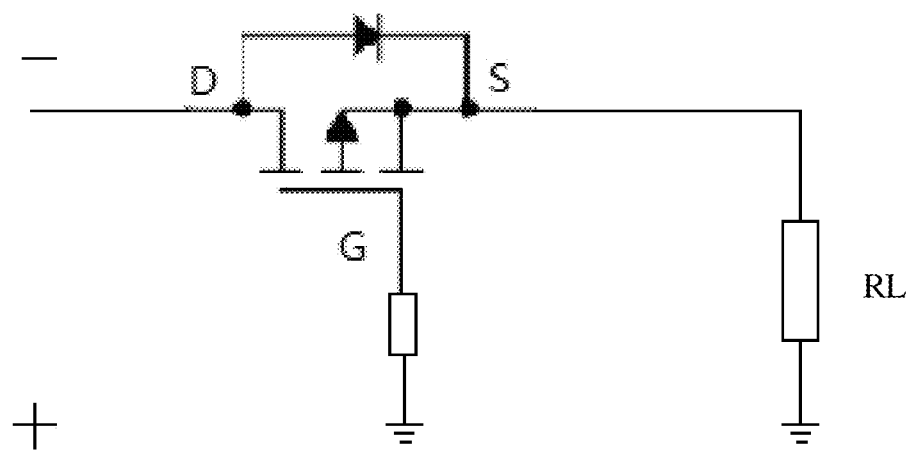
FIG. 3b is another schematic diagram of a unidirectional conductive field-effect transistor in a multi-battery charging and discharging device, in accordance with some embodiments of the present disclosure.

As shown in FIG. 3b, in a case where the input voltage of the unidirectional conductive field-effect transistor is a reverse voltage, the diode inside the unidirectional conductive field-effect transistor is in a turn-off state, and $V_{GS}$ is a positive voltage. In this case, the unidirectional conductive field-effect transistor does not satisfy the unidirectional turn-on condition. Therefore, the unidirectional conductive field-effect transistor is in the turn-off state, that is, based on changes of the input voltage of the unidirectional conductive field-effect transistor, the unidirectional conductive field-effect transistor is automatically switched freely between the turn-on state and the turn-off state.

For example, the first field-effect transistor 103 may be the unidirectional conductive field-effect transistor shown in FIG. 3a or 3b, that is, a diode is connected in parallel between a D electrode and an S electrode of a P-channel metal oxide semiconductor field-effect transistor (P-MOSFET). Based on this, the first field-effect transistor 103 includes a switching diode and a P-channel field-effect transistor.

A positive terminal of the switching diode is connected to a drain (i.e., a D electrode) of the P-channel field-effect transistor, and a negative terminal of the switching diode is connected to a source (i.e., an S electrode) of the P-channel field-effect transistor.

In a case where a voltage difference between the positive terminal and the negative terminal of the switching diode is greater than a forward turn-on voltage, the first field-effect transistor 103 is in the turn-on state, that is, the input voltage of the first field-effect transistor 103 is a forward voltage and a value of the voltage is greater than the forward turn-on voltage, and the input voltage is determined by a voltage of each rechargeable battery 102.

In a case where the voltage difference between the positive terminal and the negative terminal of the switching diode is not greater than the forward turn-on voltage, the first field-effect transistor 103 is in the turn-off state, that is, the input voltage of the first field-effect transistor 103 is a reverse voltage.

For example, the unidirectional conduction characteristic of the unidirectional conductive field-effect transistor is that in a case where a voltage difference between a positive terminal and a negative terminal of the diode inside the unidirectional conductive field-effect transistor is greater than the forward turn-on voltage, the diode is turned on first, so that when $V_{GS}$ is a negative voltage and is maintained at a certain threshold (e.g., −1.0 V to −2.5 V), the P-MOSFET is conductive between the D electrode and the S electrode thereof; and that in a case where the voltage difference between the positive terminal and the negative terminal of the diode inside the unidirectional conductive field-effect transistor is not greater than the forward turn-on voltage, the diode is reversely turned off, $V_{GS}$ is a positive voltage, and the P-MOSFET is not conductive between the D electrode and the S electrode thereof. As a result, the automatic switching between the turn-on state and the turn-off state of the unidirectional conductive field-effect transistor can be achieved without a need to control the turn-on state and the turn-off state of the unidirectional conductive field-effect transistor by a software program. Therefore, even if a software problem (e.g., crash or being stuck) occurs in the mobile terminal, each rechargeable battery 102 can be automatically protected from a problem of current backflow when supplying power to a load.

For example, a first field-effect transistor 103 is provided in a connection path between each rechargeable battery 102 and a load, and connection relationships between the rechargeable battery 102 and each electrode of the first field-effect transistor 103 and between and each electrode of the first field-effect transistor 103 the load is that a drain (i.e., a D electrode) of the first field-effect transistor 103 is connected to the rechargeable battery 102, a source (i.e., an S electrode) of the first field-effect transistor 103 is connected to the load, and a gate (i.e., a G electrode) of the first field-effect transistor 103 is grounded.

Figure 4:
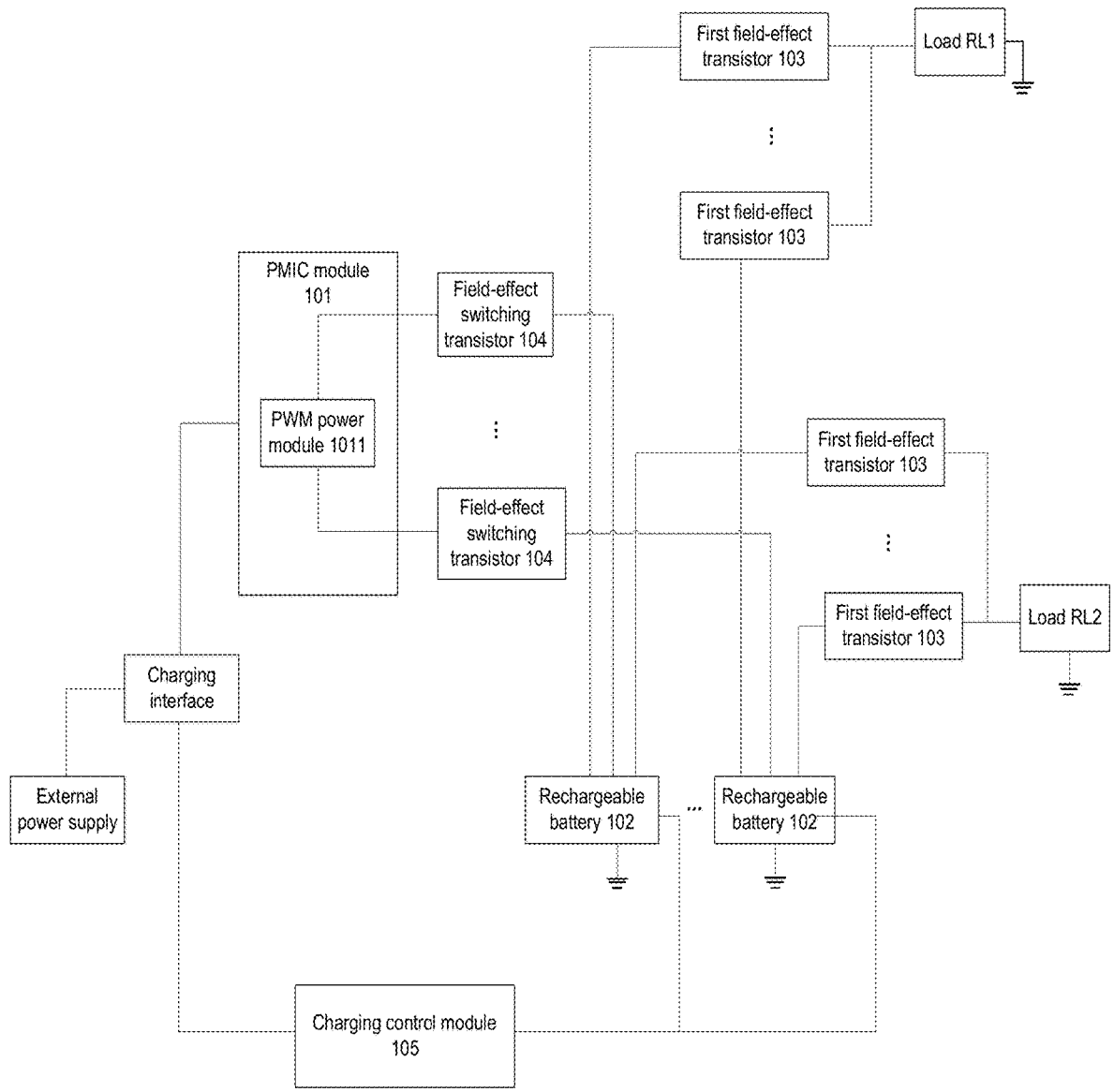
FIG. 4 is another schematic diagram showing a structure of the multi-battery charging and discharging device, in accordance with some embodiments of the present disclosure.

Further, in order to charge the rechargeable battery 102 with a larger current, thereby shortening the charging time of the rechargeable battery 102 and improving charging efficiency of the rechargeable battery 102. As shown in FIG. 4, the charging and discharging device further includes a charging control module 105.

An input of the charging control module 105 is connected to a charging interface that is used to connect an external power supply, and an output of the charging control module 105 is connected to the rechargeable battery 102.

The charging control module 105 is used to collect electric energy provided by the external power supply through the charging interface, and transmit the electric energy to the rechargeable battery 102 to charge the rechargeable battery 102.

In some embodiments of the present disclosure, the charging control module 105 is added to charge the rechargeable battery 102 simultaneously with the PMIC module 101, that is, the multiple rechargeable batteries are charged by two charging channels, i.e., the PMIC module 101 and the charging control module 105, which can achieve charging of the rechargeable battery 102 by a large current formed by multiple batteries connected in parallel, thereby shortening the charging time of the rechargeable battery 102 and improving the charging efficiency of the rechargeable battery 102.

Further, considering that the PMIC module 101 is a core component, in order to prevent performance of the PMIC module 101 from being damaged due to a current impact caused by the acquisition of the electric signal of the charging interface, the newly added charging control module 105 acquires the electric signal of the charging interface, performs charging identification, and sends a corresponding command to the PMIC module 101 after determining that the charging interface is connected to the external power supply and the charging needs to be started, so as to trigger the charging of the rechargeable battery 102 through a charging channel where the PMIC module 101 is located. Based on this, the charging control module 105 is connected to the PMIC module 101.

The charging control module 105 is used to acquire an electrical signal of the charging interface, determine whether the charging interface is connected to the external power supply according to the electrical signal, and send a charging start command to the PMIC module 101 after determining that the charging interface is connected to the external power supply.

The PMIC module 101 is used to control the field-effect switching transistor 104 to switch to a turn-on state after receiving the charging start command sent by the charging control module 105, and transmit the electric energy of the external power supply to the rechargeable battery 102 to charge the rechargeable battery 102.

Figure 5:
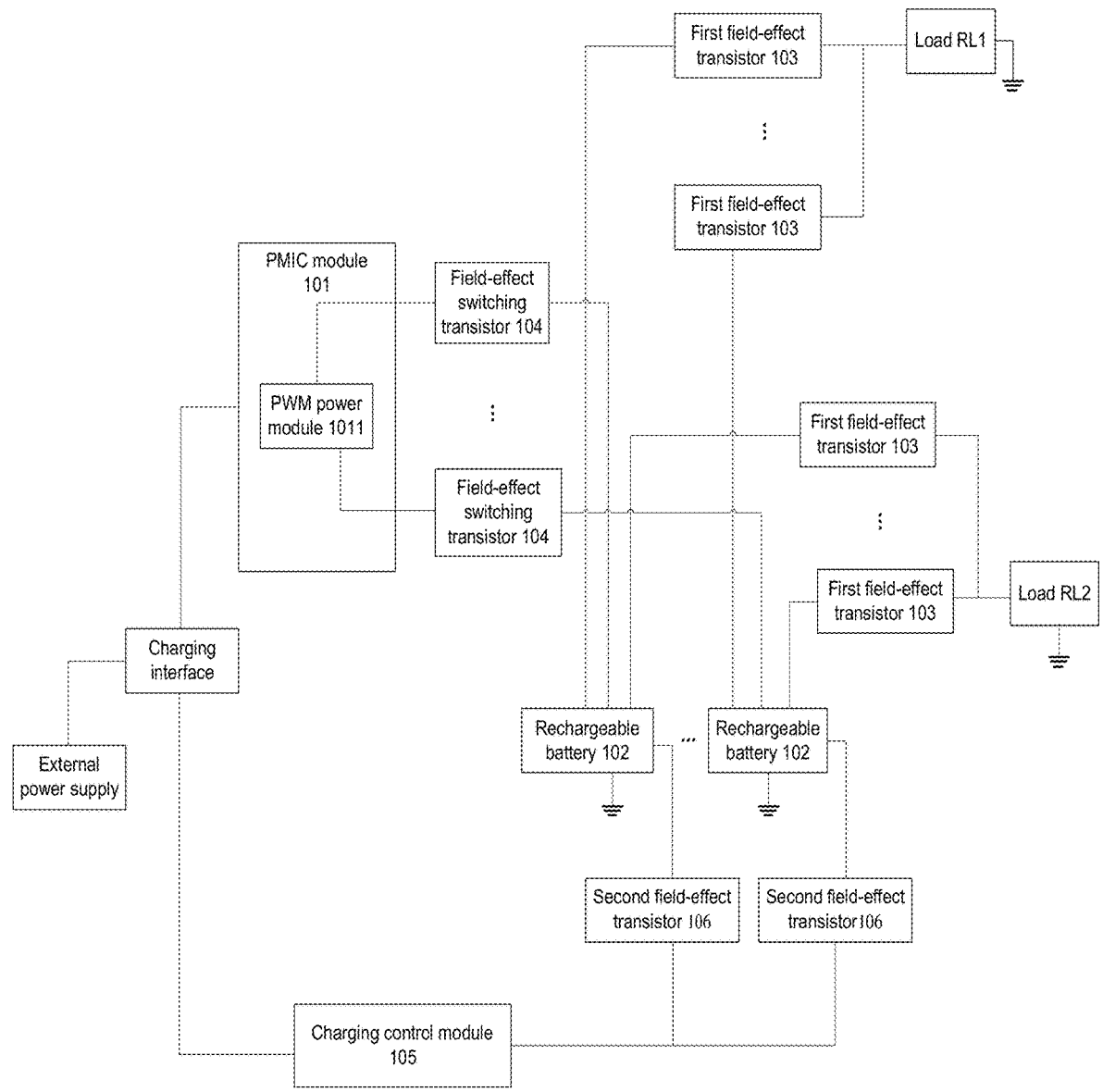
FIG. 5 is yet another schematic diagram showing a structure of the multi-battery charging and discharging device, in accordance with some embodiments of the present disclosure.

Further, considering that in the charging channel where the charging control module 105 is used to charge the rechargeable battery 102, a difference between internal resistors of the rechargeable batteries 102 may be large, which causes that the voltage difference between the rechargeable batteries 102 is greater than the preset threshold, and further the phenomenon of current backflow between the rechargeable batteries 102 occurs, as shown in FIG. 5, the charging and discharging device further includes second field-effect transistors 106.

A second field-effect transistor 106 is provided in a connection path between each rechargeable battery 102 and the charging control module 105, and is used to control the connection path between the rechargeable battery 102 and the charging control module 105 to be turned on or turned off.

Similarly, the second field-effect transistor 106 may also be the unidirectional conductive field-effect transistor shown in FIG. 3a or 3b, that is, a diode is connected in parallel between a D electrode and an S electrode of a P-MOSFET. Based on this, the second field-effect transistor 106 includes a switching diode and a P-channel field-effect transistor.

A positive terminal of the switching diode is connected to a drain (i.e., a D electrode) of the P-channel field-effect transistor, and a negative terminal of the switching diode is connected to a source (i.e., an S electrode) of the P-channel field-effect transistor.

In a case where a voltage difference between the positive terminal and the negative terminal of the switching diode is greater than a forward turn-on voltage, the second field-effect transistor 106 is in a turn-on state, that is, an input voltage of the second field-effect transistor 106 is a forward voltage greater than the forward turn-on voltage, and the input voltage is determined by an input voltage of the charging control module 105 and a voltage of the rechargeable battery 102 connected to the second field-effect transistor 106.

In a case where the voltage difference between the positive terminal and the negative terminal of the switching diode is not greater than the forward turn-on voltage, the second field-effect transistor 106 is in a turn-off state, that is, the input voltage of the second field-effect transistor 106 is a reverse voltage.

For example, a second field-effect transistor 106 is provided in a connection path between each rechargeable battery 102 and the charging control module 105, and connection relationships between the rechargeable battery 102 and each electrode of the second field-effect transistor 106 and between the charging control module 105 and each electrode of the second field-effect transistor 106 are that a drain (i.e., a D electrode) of the second field-effect transistor 106 is connected to the charging control module 105, a source (i.e., an S electrode) of the second field-effect transistor 106 is connected to the rechargeable battery 102, and a gate (i.e., a G electrode) of the second field-effect transistor 106 is grounded.

In the case where the voltage difference between the rechargeable batteries 102 is greater than the preset threshold, that is, a voltage difference between sources (i.e., S electrodes) of the second field-effect transistors 106 is greater than the preset threshold, since drains (i.e., D electrodes) of the second field-effect transistors 106 are connected to the charging control module 105, that is, values of voltages of the drains (i.e., the D electrodes) of the second field-effect transistors 106 are the same. In this case, a second field-effect transistor 106 connected to a rechargeable battery 102 with a small voltage value preferably satisfies the forward turn-on condition. Therefore, the second field-effect transistors 106 connected to the rechargeable batteries 102 may be controlled not to be simultaneously turned on by controlling an output voltage of the charging control module 105. For example, the charging control module 105 may select the rechargeable battery 102 with the small voltage value to charge; and since a second field-effect transistor 106 connected to a rechargeable battery 102 with a large voltage value is in a turn-off state, a connection path between the rechargeable battery 102 with the large voltage value and the charging control module 105 is turned off, so that rechargeable batteries 102 in a circuit that uses the charging control module 105 to charge the multiple rechargeable batteries are not directly connected in parallel, thereby avoiding the phenomenon of current backflow between the rechargeable batteries 102 in the charging process.

For example, in the charging channel where the charging control module 105 is used to charge the rechargeable battery 102, a charging voltage needs to be controlled, so that in a case where a voltage difference between two rechargeable batteries 102 is greater than the preset threshold, a first field-effect transistor 103 connected to one rechargeable battery 102 is in a turn-on state, and a second field-effect transistor 106 connected to the other rechargeable battery 102 is in a turn-off state. Based on this, the charging control module 105 is further used to obtain a voltage signal of each rechargeable battery 102, and control the charging voltage transmitted to the rechargeable battery 102 according to a current voltage value corresponding to each voltage signal. For example, the PMIC module 101 may acquire the voltage signal of the rechargeable battery 102, and transmit the acquired voltage signal to the charging control module 105.

The above-mentioned charging voltage is greater than a first voltage value and less than a second voltage value, or equal to a specified voltage value. The first voltage value is a sum of a minimum value in current voltage values and the forward turn-on voltage of the second field-effect transistor 106, the second voltage value is a sum of a target value in the current voltage values and the forward turn-on voltage of the second field-effect transistor 106, and the target value is a voltage value in current voltage values that is first greater than the minimum value by the preset threshold. In this way, in the case where the voltage difference between the rechargeable batteries 102 is greater than the preset threshold, the second field-effect transistor 106 connected to the rechargeable battery 102 with the small voltage value is in a turn-on state, and the second field-effect transistor 106 connected to the rechargeable battery 102 with the large voltage value is in the turn-off state.

Taking an example in which there are three rechargeable batteries 102, if current voltage values corresponding to voltage signals of a first rechargeable battery, a second rechargeable battery and a third rechargeable battery are 3.6 V, 3.9 V and 4.0 V respectively, and the forward turn-on voltage of the second field-effect transistor 106 is 0.25 V, it will be seen therefrom that, the minimum value is 3.6 V, and the target value (i.e., the voltage value that is first greater than the minimum value by the preset threshold) is 3.9 V. Therefore, the first voltage value is 3.85 V, and the second voltage value is 4.15 V, that is, the charging voltage is greater than 3.85 V and less than 4.15 V.

For example, the charging control module 105 controls the charging voltage transmitted to the rechargeable battery to be 4.0 V. In this case, a voltage difference between a D electrode and an S electrode of a second field-effect transistor 106 connected to the first rechargeable battery is 0.4 V, and a diode inside the second field-effect transistor 106 satisfies the forward turn-on condition, which makes the second field-effect transistor 106 enter a turn-on state. A voltage difference between a D electrode and an S electrode of a second field-effect transistor 106 connected to the second rechargeable battery is 0.1 V, and a diode inside the second field-effect transistor 106 does not satisfy the forward turn-on condition, which makes the second field-effect transistor 106 is in a turn-off state. Similarly, a voltage difference between a D electrode and an S electrode of a second field-effect transistor 106 connected to the third charging battery is 0 V, and a diode inside the second field-effect transistor 106 does not satisfy the forward turn-on condition, which makes the second field-effect transistor 106 is also in a turn-off state. As a result, among a connection path between the first rechargeable battery and the charging control module 105, a connection path between the second rechargeable battery and the charging control module 105, and a connection path between the third rechargeable battery and the charging control module 105, only the connection path between the first rechargeable battery and the charging control module 105 is turned on, and the charging control module 105 charges the first rechargeable battery, so that the rechargeable batteries in the circuit that uses the charging control module 105 to charge the multiple rechargeable batteries are not directly connected in parallel, thereby avoiding the phenomenon of current backflow between the rechargeable batteries in the charging process.

Figure 6:
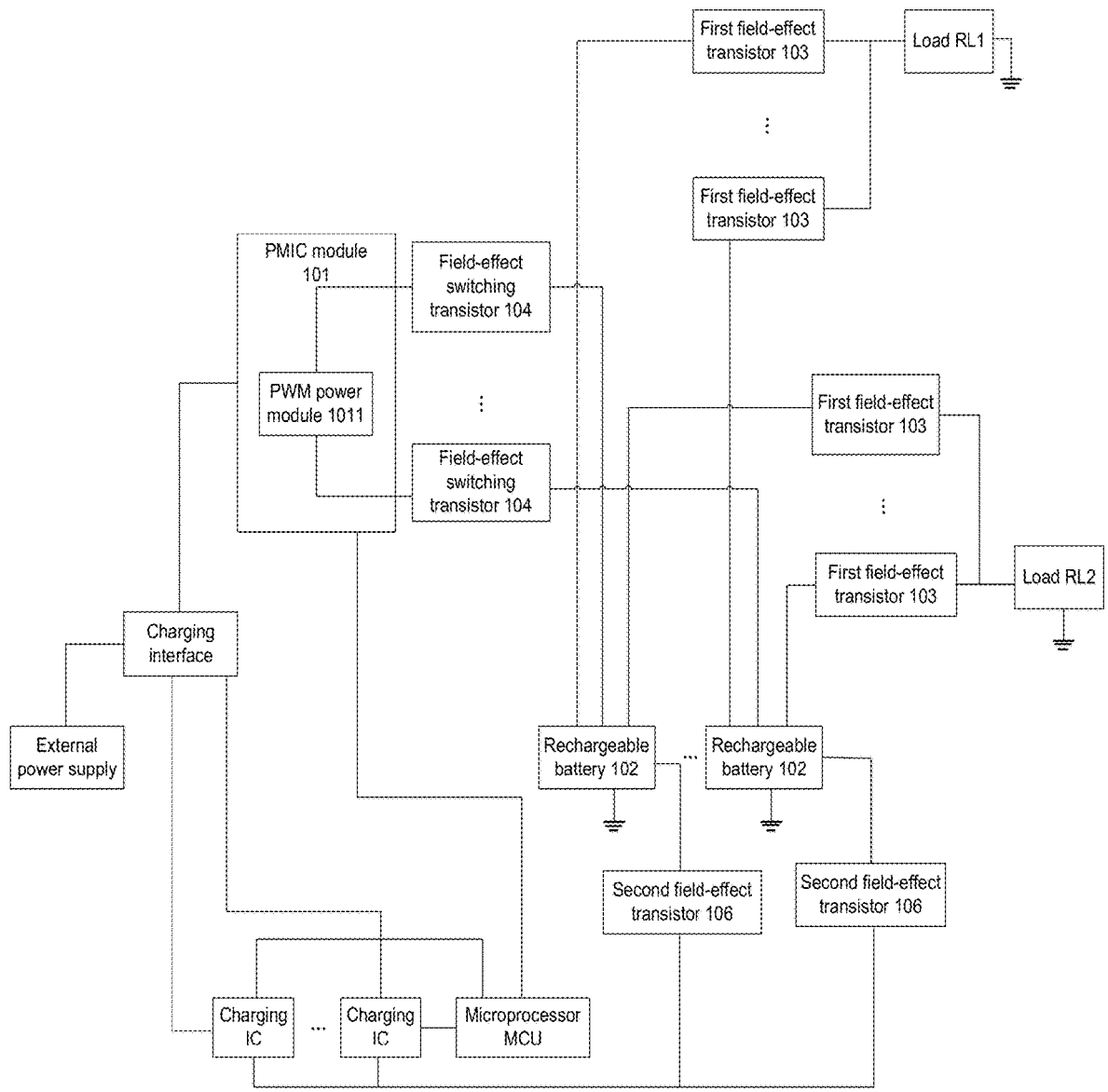
FIG. 6 is yet another schematic diagram showing a structure of the multi-battery charging and discharging device, in accordance with some embodiments of the present disclosure.

For example, in order to better control the charging of the rechargeable battery 102, each rechargeable battery 102 is provided with a charging IC. Based on this, as shown in FIG. 6, the charging control module 105 includes a plurality of charging ICs and a microprocessor MCU.

Each charging IC is connected to a rechargeable battery 102 through a second field-effect transistor 106.

The microprocessor MCU is used to obtain the voltage signal of each rechargeable battery 102, and determine whether there is a voltage value greater than the minimum value by the preset threshold according to the current voltage value corresponding to each voltage signal. For example, multiple current voltage values are compared to determine whether the phenomenon of current backflow exists when the multiple rechargeable batteries are simultaneously turned on and charged. In a case where it is determined that the phenomenon of current backflow exists, the charging voltage of the rechargeable battery 102 is controlled to make rechargeable batteries 102 with the phenomenon of current backflow are not simultaneously turned on.

If so, the target value that is first greater than the minimum value by the preset threshold and the minimum value are determined, and a voltage greater than the first voltage value and less than the second voltage value is determined as the charging voltage of the rechargeable battery 102. The first voltage value is the sum of the minimum value and the forward turn-on voltage of the second field-effect transistor 106, and the second voltage value is the sum of the target value and the forward turn-on voltage of the second field-effect transistor 106.

If not, a specified voltage value is determined as the charging voltage of the rechargeable battery 102. The specified voltage value is greater than a third voltage value, and the third voltage value is a sum of a maximum value in the current voltage values and the forward turn-on voltage of the second field-effect transistor 106.

After the charging voltage is determined, a control command carrying the determined charging voltage is transmitted to the charging IC.

The charging IC is used to control the charging voltage transmitted to the rechargeable battery 102 according to the received control command.

The second field-effect transistor 106 is used to control a connection path between a rechargeable battery 102 and a charging IC to be turned on or turned off.

For example, the PMIC module 101 may obtain the voltage signal of each rechargeable battery 102, and transmit the voltage signal to the microprocessor MCU, so that the microprocessor MCU controls a magnitude of a charging current of the charging IC according to the voltage signal of each rechargeable battery 102, or controls the charging IC to stop or start charging.

In a case where a plurality of voltage differences between the multiple current voltage values are greater than the preset threshold (i.e., there being a voltage value greater than the minimum value by the preset threshold in the multiple current voltage values), it indicates that the phenomenon of current backflow occurs in the charging process when corresponding rechargeable batteries 102 are simultaneously turned on. Therefore, it is necessary to control a second field-effect transistor 106 connected to a rechargeable battery 102 with a voltage value less than the target value to be in a turn-on state, and control a second field-effect transistor 106 connected to a rechargeable battery 102 with a voltage value greater than or equal to the target value to be in a turn-off state. That is, it is ensured that a second field-effect transistor 106 connected to a rechargeable battery 102 with a small current voltage value satisfies the forward turn-on condition, and a second field-effect transistor 106 connected to a rechargeable battery 102 with a large current voltage value does not satisfy the forward turn-on condition. Since the charging voltage is greater than the first voltage value (the sum of the minimum value and the forward turn-on voltage of the second field-effect transistor 106) and is less than the second voltage value (the sum of the target value, and the forward turn-on voltage of the second field-effect transistor 106), and thus the second field-effect transistor 106 connected to the rechargeable battery 102 with the current voltage value less than the target value is in the turn-on state, and the second field-effect transistor 106 connected to the rechargeable battery 102 with the current voltage value greater than or equal to the target value is in the turn-off state.

In a case where a difference between the maximum value and the minimum value in the multiple current voltage values is not greater than the preset threshold (i.e., there being no voltage value greater than the minimum value by the preset threshold in the multiple current voltage values), it indicates that the phenomenon of current backflow does not occur in the charging process when the multiple rechargeable batteries are simultaneously turned on. Therefore, the rechargeable battery 102 may be charged directly according to the specified voltage value, and the specified voltage value enables each second field-effect transistor 106 to satisfy the forward turn-on condition, i.e., enabling the second field-effect transistor 106 connected to each rechargeable battery 102 to be in the turn-on state.

Figure 7:
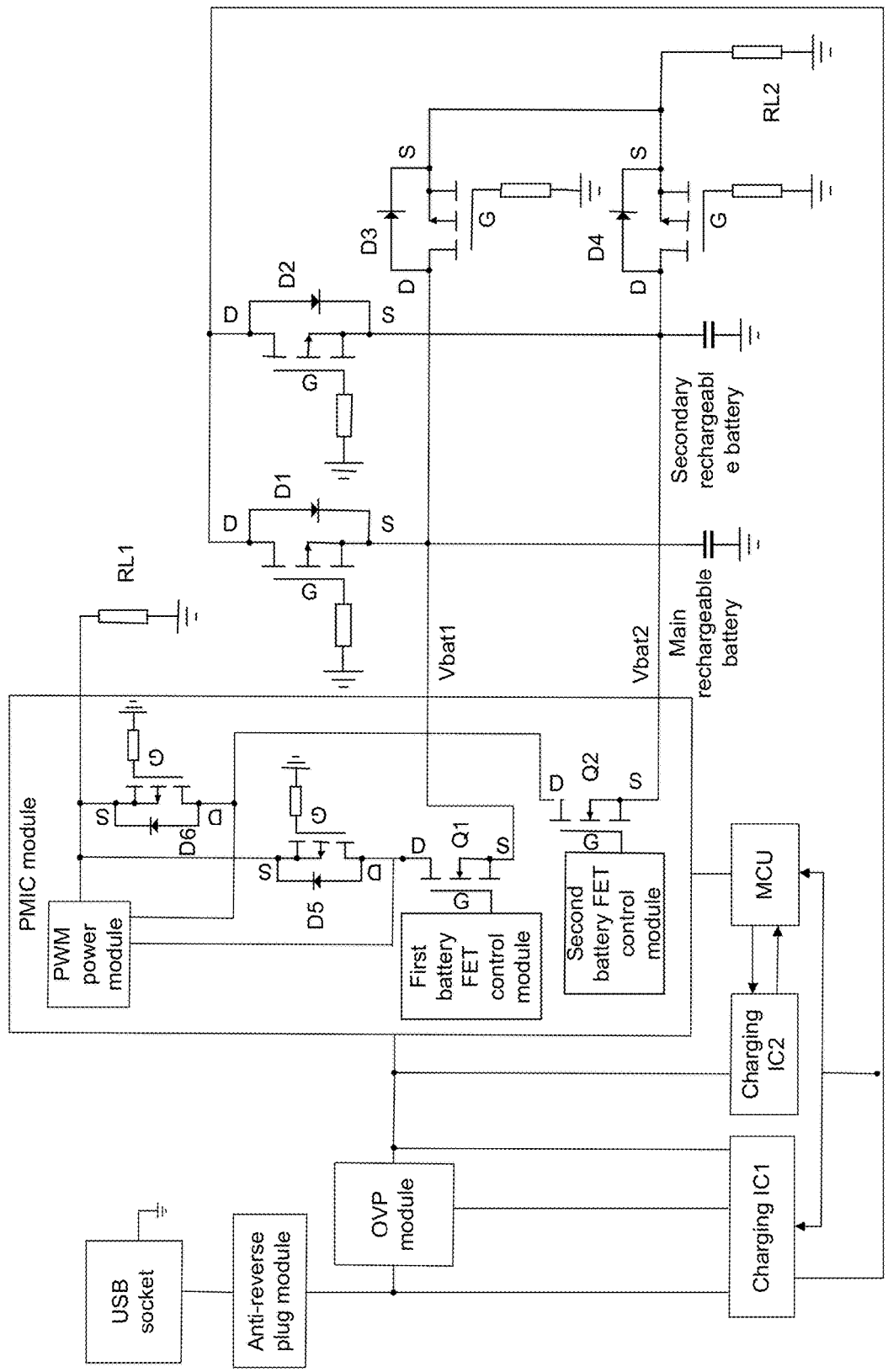
FIG. 7 is yet another schematic diagram showing a structure of the multi-battery charging and discharging device, in accordance with some embodiments of the present disclosure.

For example, in some optional embodiments, as shown in FIG. 7, two rechargeable batteries are taken as an example, that is, the multi-battery charging and discharging device includes a main rechargeable battery and a secondary rechargeable battery. A unidirectional conductive field-effect transistor provided in a connection path between the main rechargeable battery and the load RL2 and a unidirectional conductive field-effect transistor provided in a connection path between the secondary rechargeable battery and the load RL2 are D3 and D4, respectively. A unidirectional conductive field-effect transistor provided in a connection path between the main rechargeable battery and the load RL1 and a unidirectional conductive field-effect transistor provided in a connection path between the secondary rechargeable battery and the load RL1 are D5 and D6, respectively. A unidirectional conductive field-effect transistor provided in a connection path between the main rechargeable battery and a charging IC1 is D1, and a unidirectional conductive field-effect transistor provided in a connection path between the secondary rechargeable battery and the charging IC2 is D2. The main rechargeable battery and the secondary rechargeable battery are respectively connected to the PWM power module of the PMIC module through a field-effect switching transistor Q1 and a field-effect switching transistor Q2. The terminals of the field-effect switching transistors connected to the PWM power module are separated from each other, and the microprocessor MCU is connected to the charging IC1, the charging IC2 and the PMIC module.

Optionally, in order to facilitate unified control of the PMIC module, the field-effect switching transistor Q1, the field-effect switching transistor Q2, a first batt FET control module that controls turning on and off of the field-effect switching transistor Q1, and a second batt FET control module that controls turning on and off of the field-effect switching transistor Q2 are all provided in the PMIC module.

In addition, since the load RL1 consumes less power and less current, compared with the unidirectional conductive field-effect transistors D1 and D2, the unidirectional conductive field-effect transistors D5 and D6 may be made smaller in volume, so that the unidirectional conductive field-effect transistors D5 and D6 in the connection path between the load RL1 and the rechargeable battery may also be provided in the PMIC module.

(1) For the unidirectional conductive field-effect transistors D3 and D4, drains (i.e., D electrodes) of the unidirectional conductive field-effect transistors are connected to the rechargeable batteries, sources (i.e., S electrodes) of the unidirectional conductive field-effect transistors are connected to the load RL2, and gates (i.e., G electrodes) of the unidirectional conductive field-effect transistors are grounded. For example, a voltage of the drain of the unidirectional conductive field-effect transistor D3 is $V_{bat1}$ (i.e., a voltage of the main rechargeable battery), and a voltage of the drain of the unidirectional conductive field-effect transistor D4 is $V_{bat2}$ (i.e., a voltage of the secondary rechargeable battery).

(2) For the unidirectional conductive field-effect transistors D5 and D6, drains (i.e., D electrodes) of the unidirectional conductive field-effect transistors are connected to the rechargeable batteries, sources (i.e., S electrodes) of the unidirectional conductive field-effect transistors are connected to the load RL1, and gates (i.e., G electrodes) of the unidirectional conductive field-effect transistors are grounded. For example, a voltage of the drain of the unidirectional conductive field-effect transistor D5 is $V_{bat1}$ (i.e., a voltage of the main rechargeable battery), and a voltage of the drain of the unidirectional conductive field-effect transistor D6 is $V_{bat2}$ (i.e., a voltage of the secondary rechargeable battery).

(3) For the unidirectional conductive field-effect transistors D1 and D2, drains (i.e., D electrodes) of the unidirectional conductive field-effect transistors are connected to the charging ICs, sources (i.e., S electrodes) of the unidirectional conductive field-effect transistors are connected to the rechargeable batteries, and gates (i.e., G electrodes) of the unidirectional conductive field-effect transistors are grounded. For example, a voltage of the drain of the unidirectional conductive field-effect transistor D1 is an output voltage of the charging IC1, a voltage of the drain of the unidirectional conductive field-effect transistor D2 is an output voltage of the charging IC2, a voltage of the source of the unidirectional conductive field-effect transistor D1 is $V_{bat1}$ (i.e., a voltage of the main rechargeable battery), and a voltage of the source of the unidirectional conductive field-effect transistor D2 is $V_{bat2}$ (i.e., a voltage of the secondary rechargeable battery).

First, for a charging process of the main rechargeable battery and the secondary rechargeable battery, the charging IC1 acquires an electrical signal of a USB socket, and determines whether a charger is plugged into the USB socket according to the electrical signal. After determining that the charger is plugged into the USB socket (i.e., the charger being connected to an external power supply), the charging IC1 transmits a corresponding indication signal to the microprocessor MCU, so that the microprocessor MCU sends the charging start command to the PMIC module. For example, according to a normal operating voltage range supported by the charging IC1, in a case where a voltage of an input is higher than a lower limit value in the voltage range, it is determined that the plugged charger is valid; and in a case where the voltage of the input is higher than an upper limit value in the voltage range, the charging IC1 enters an overvoltage protection state. After the charging is started, a charging current of the USB socket flows to the PMIC module, the charging IC1 and the charging IC2 through an anti-reverse plug module and an overvoltage protection (OVP) module.

The charging IC has an overvoltage protection function. For example, by setting an overvoltage protection threshold of the input of the charging IC, in a case where a voltage of the USB socket, i.e., $V_{USB}$, is higher than the overvoltage protection threshold, the charging IC controls the OVP module to turn off a charging path and performs overvoltage protection event alarm, thereby protecting the PMIC module and improving reliability of the PMIC module.

A first charging path is that: the first batt FET control module and the second batt FET control module respectively control the field-effect switching transistor Q1 and the field-effect switching transistor Q2 to be turned on, and the PWM power module of the PMIC module charges the main rechargeable battery and the secondary rechargeable battery through the field-effect switching transistor Q1 and the field-effect switching transistor Q2; and the PWM power module of the PMIC module supplies power to the load RL1 through a power network VPH_PWR; and the PWM power module of the PMIC module supplies power to the load RL2 through the field-effect switching transistor Q1, the field-effect switching transistor Q2, the unidirectional conductive field-effect transistor D3 and the unidirectional conductive field-effect transistor D4.

In a process of charging the main rechargeable battery and the secondary rechargeable battery by using the first charging path, since the terminals of the field-effect switching transistors connected to the PWM power module are separated from each other, that is, when the field-effect switching transistors are each turned on, the terminals of the rechargeable batteries connected to the PWM power module are separated from each other, so that the rechargeable batteries in the charging circuit that uses the PWM power module to control the charging are not directly connected in parallel, thereby avoiding the phenomenon of current backflow between the rechargeable batteries in the charging process.

A second charging path is that the PMIC module sends a control signal to the microprocessor MCU, and the microprocessor MCU controls the charging IC1 and the charging IC2 to charge the main rechargeable battery and the secondary rechargeable battery through the unidirectional field-effect transistors D1 and D2.

For example, the forward turn-on voltage of the unidirectional conductive field-effect transistor is 0.25 V, and an internal resistor of the main rechargeable battery is less than an internal resistor of the secondary rechargeable battery. Before the charging IC starts to charge the rechargeable battery, a value of a voltage of the main rechargeable battery is 3.9 V, and a value of a voltage of the secondary rechargeable battery is 3.6 V. It will be seen therefrom that, the minimum value is 3.6 V, and the target value (i.e., the voltage value that is first greater than the minimum value by the preset threshold) is 3.9 V. Therefore, the first voltage value is 3.85 V, and the second voltage value is 4.15 V, that is, the charging voltage is greater than 3.85 V and less than 4.15 V.

For example, the charging IC controls the charging voltage transmitted to the rechargeable battery to be 4.0 V. In this case, a voltage difference between a D electrode and an S electrode of the unidirectional conductive field-effect transistor D2 connected to the secondary rechargeable battery is 0.4 V, and a diode inside the unidirectional conductive field-effect transistor D2 satisfies the forward turn-on condition, and the unidirectional conductive field-effect transistor D2 enters a turn-on state. A voltage difference between a D electrode and an S electrode of the unidirectional conductive field-effect transistor D1 connected to the main rechargeable battery is 0.1 V, and a diode inside the unidirectional conductive field-effect transistor D1 does not satisfy the forward turn-on condition, and the unidirectional conductive field-effect transistor D1 is in a turn-off state. As a result, among the connection paths between the rechargeable batteries and the charging ICs, only the connection path between the secondary rechargeable battery and the charging IC2 is turned on, and the charging IC2 charges the secondary rechargeable battery. In this way, the main rechargeable battery and the secondary rechargeable battery in a circuit that uses the charging ICs to charge the multiple rechargeable batteries are not directly connected in parallel, thereby avoiding the phenomenon of current backflow between the rechargeable batteries in the charging process.

In addition, for a discharging process of the main rechargeable battery and the secondary rechargeable battery, after detecting that the charger plugged into the USB socket is unplugged, the charging IC1 transmits a corresponding indication signal to the microprocessor MCU, such that the microprocessor MCU sends a charging stop command to the PMIC module, the PMIC module controls the PWM power module to stop working, the main rechargeable battery supplies power to the load RL1 through the field-effect switching transistor Q1 and the unidirectional conductive field-effect transistor D5, and the secondary rechargeable battery supplies power to the load RL1 through the field-effect switching transistor Q2 and the unidirectional conductive field-effect transistor D6; and that the main rechargeable battery supplies power to the load RL2 through the unidirectional conductive field-effect transistor D3, and the secondary rechargeable battery supplies power to the load RL2 through the unidirectional conductive field-effect transistor D4.

In a process of supplying power to the loads by the rechargeable batteries, once a voltage difference between the main rechargeable battery and the secondary rechargeable battery is greater than the preset threshold, a unidirectional conductive field-effect transistor connected to one of the rechargeable batteries is in a turn-on state, and a unidirectional conductive field-effect transistor connected to the other rechargeable battery is in a turn-off state, which is specifically as follows.

For example, the forward turn-on voltage of the unidirectional conductive field-effect transistor is 0.25 V, and the internal resistor of the main rechargeable battery is less than the internal resistor of the secondary rechargeable battery. After the charging of the main rechargeable battery and the secondary rechargeable battery is accomplished, a value of $V_{bat1}$ is 4.0 V, and a value of $V_{bat2}$ is 3.7 V. If the main rechargeable battery and the secondary rechargeable battery are directly connected in parallel, the phenomenon of current backflow will occur between the main rechargeable battery and the secondary rechargeable battery. However, for a process of supplying power to the load RL2 by the main rechargeable battery and the secondary rechargeable battery, since the unidirectional conductive field-effect transistor D3 is provided between the main rechargeable battery and the load RL2, and the unidirectional conductive field-effect transistor D4 is provided between the secondary rechargeable battery and the load RL2, in a case where a difference between $V_{bat1}$ and $V_{bat2}$ is greater than the forward turn-on voltage, the unidirectional conductive field-effect transistor D3 enters a turn-on state, and the unidirectional conductive field-effect transistor D4 is in a turn-off state. Therefore, the main rechargeable battery and the secondary rechargeable battery are not directly connected in parallel, and the phenomenon of current backflow does not occur.

For example, an input voltage of the unidirectional conductive field-effect transistor D3 is a forward voltage, and the unidirectional conductive field-effect transistor D3 enters the turn-on state. After the unidirectional conductive field-effect transistor D3 is turned on, a value of the voltage of the source (i.e., the S electrode) of the unidirectional conductive field-effect transistor D4 is 4.0 V, and a value of the voltage of the drain (i.e., the D electrode) of the unidirectional conductive field-effect transistor D4 is 3.7 V. In this case, an input voltage of the unidirectional conductive field-effect transistor D4 is a reverse voltage. Therefore, the unidirectional conductive field-effect transistor D4 is in the turn-off state.

Similarly, for a process of supplying power to the load RL1 by the main rechargeable battery and the secondary rechargeable battery, since the unidirectional conductive field-effect transistor D5 is provided between the main rechargeable battery and the load RL1, and the unidirectional conductive field-effect transistor D6 is provided between the secondary rechargeable battery and the load RL1, in a case where a difference between $V_{bat1}$ and $V_{bat2}$ is greater than the forward turn-on voltage, the unidirectional conductive field-effect transistor D5 enters a turn-on state, and the unidirectional conductive field-effect transistor D6 is in a turn-off state. Therefore, the main rechargeable battery and the secondary rechargeable battery are not directly connected in parallel, and the phenomenon of current backflow does not occur.

For the multi-battery charging and discharging device in some embodiments of the present disclosure, each rechargeable battery in the multi-battery charging and discharging device is connected to the PWM power module of the PMIC module through a field-effect switching transistor, and a connection path between a rechargeable battery and a load is controlled to be turned on or turned off by using a first field-effect transistor. That is, each rechargeable battery is equipped with a field-effect switching transistor, and the terminals of the field-effect switching transistors connected to the PWM power module are separated from each other, so as to prevent the phenomenon of current backflow between the batteries in the charging process. Moreover, a unidirectional conductive field-effect transistor is provided in a connection path between a rechargeable battery and any load to prevent the phenomenon of current backflow between the batteries in the discharging process, thereby avoiding affecting the service life of the batteries due to the current backflow between the batteries, providing the technical support for achieving the charging and discharging of the multiple batteries, and prolonging the standby time of the mobile terminal in which the device is used as the power supply.

Figure 8:
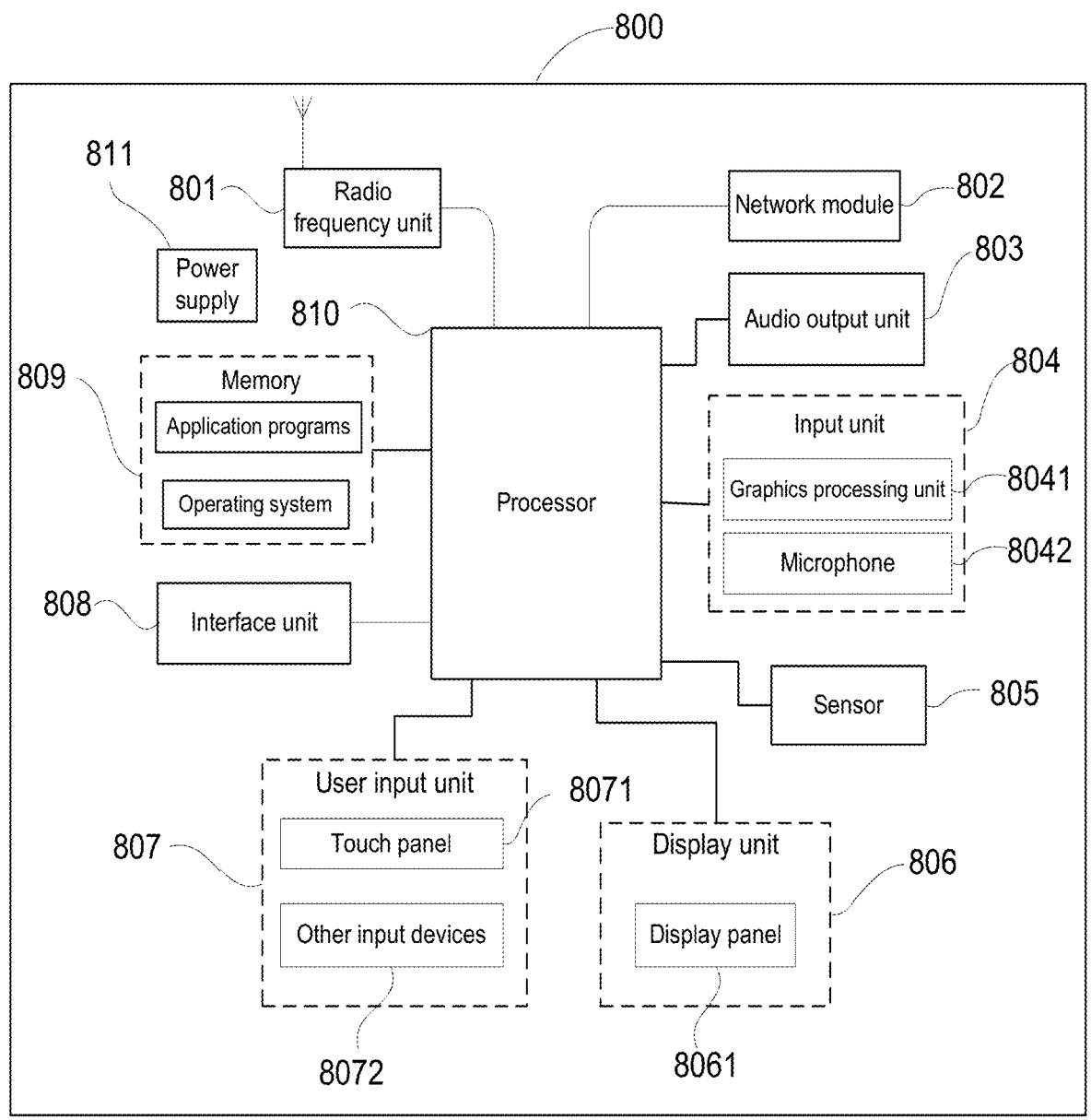
FIG. 8 is a schematic diagram showing a structure of a mobile terminal, in accordance with some embodiments of the present disclosure.

In order to further explain the mobile terminal related to the multi-battery charging and discharging device, some embodiments of the present disclosure further provide a mobile terminal including the multi-battery charging and discharging device provided by the above embodiments of the present disclosure. FIG. 8 is a schematic diagram showing a structure of a mobile terminal, in accordance with some embodiments of the present disclosure. The mobile terminal may be the mobile terminal related to the multi-battery charging and discharging device.

FIG. 8 is a schematic diagram showing a hardware structure of a mobile terminal for implementing the embodiments of the present disclosure. Referring to FIG. 8, the mobile terminal 800 includes, but is not limited to, a radio frequency unit 801, a network module 802, an audio output unit 803, an input unit 804, a sensor 805, a display unit 806, a user input unit 807, an interface unit 808, a memory 809, a processor 180, and a power supply 811. A person skilled in the art will understand that, the structure of the mobile terminal shown in FIG. 8 does not constitute a limitation on the mobile terminal, and the mobile terminal may include more or fewer components than those shown in the figure, or a combination of certain components, or components with different arrangements. In the embodiments of the present disclosure, the mobile terminal includes, but is not limited to, a mobile phone, a tablet computer, a notebook computer, a palm computer, a vehicle-mounted terminal, a wearable device, and a pedometer.

The radio frequency unit 801 may be used to receive and transmit signals in a process of receiving and sending information or during a call. For example, the radio frequency unit 801 receives downlink data from a base station and then transmits the downlink data to the processor 180 to process the data. In addition, the radio frequency unit 801 transmits uplink data to the base station. In general, the radio frequency unit 801 includes, but is not limited to, an antenna, at least one amplifier, a transceiver, a coupler, a low noise amplifier, and a duplexer. In addition, the radio frequency unit 801 may further communicate with a network and other devices through a wireless communication system.

The mobile terminal provides wireless broadband access to Internet to a user through the network module 802, such as helping the user to send and receive e-mails, to browse web pages, and to access streaming media.

The audio output unit 803 may convert audio data received by the radio frequency unit 801 or the network module 802 or stored in the memory 809 into audio signals and output the audio signals as sound. Moreover, the audio output unit 803 may further output audio associated with a specific function performed by the mobile terminal 800 (e.g., call signal reception sound and message reception sound). The audio output unit 803 includes a speaker, a buzzer, and a receiver.

The input unit 804 is used to receive audio signals or video signals. The input unit 804 may include a graphics processing unit (GPU) 8041 and a microphone 8042. The GPU 8041 processes image data of still pictures or videos obtained by an image capture device (e.g., a camera) in a video capture mode or an image capture mode. The processed image frames may be displayed on the display unit 806. The image frames processed by the GPU 8041 may be stored in the memory 809 (or other storage media) or sent via the radio frequency unit 801 or the network module 802. The microphone 8042 may receive sound and is capable of processing the sound into audio data. The processed audio data may be converted into a format that may be transmitted via the radio frequency unit 801 and output to a mobile communication base in a case of a phone call mode.

The mobile terminal 800 further includes at least one type of sensor 805, for example, a light sensor, a motion sensor, and other sensors. For example, the light sensor includes an ambient light sensor and a proximity sensor. The ambient light sensor may adjust brightness of a display panel 8061 according to brightness of the ambient light. The proximity sensor may turn off the display panel 8061 and/or backlight when the mobile terminal 800 is moved to an ear. As a type of the motion sensor, an accelerometer sensor may detect magnitudes of accelerations in various directions (generally three axes), and may detect a magnitude and a direction of gravity when the mobile terminal is still, and may be used to identify postures of the mobile terminal (e.g., in the switching between a horizontal screen and a vertical mode, in related games, and in calibrating magnetometer posture), and identify related functions (e.g., pedometer and knocking) through vibration. The sensor 805 may further include a fingerprint sensor, a pressure sensor, an iris sensor, a molecular sensor, a gyroscope, a barometer, a hygrometer, a thermometer, or an infrared sensor, and details are not repeated herein.

The display unit 806 is used to display information input by the user or information provided to the user. The display unit 806 may include the display panel 8061, which may be configured in a form of a liquid crystal display (LCD), organic light-emitting diodes (OLEDs), or the like.

The user input unit 807 may be used to receive input digital or character information and generate input key signals related to user settings and function control of the mobile terminal. For example, the user input unit 807 includes a touch panel 8071 and other input devices 8072. The touch panel 8071, also referred to as a touch screen, may acquire a touch operation by the user on or near the touch panel 8071 (e.g., operation by the user on or near the touch panel 8071 by using any suitable object or accessory such as a finger and a stylus). The touch panel 8071 may include two portions, i.e., a touch detection device and a touch controller. The touch detection device detects a touch position of the user and a signal generated by the touch operation, and transmits the signal to the touch controller. The touch controller receives touch information from the touch detection device, converts the touch information into coordinates of a touch point, sends the coordinates of the touch point to the processor 180, receives a command from the processor 180, and executes the command. In addition, the touch panel 8071 may be implemented by various types of touch panels such as a resistive touch panel, a capacitive touch panel, an infrared touch panel, and a surface acoustic wave touch panel. The user input unit 807 may further include other input devices 8072 besides the touch panel 8071. Specifically, the other input devices 8072 may include, but are not limited to, a physical keyboard, function keys (e.g., volume control keys and a switch key), a trackball, a mouse, and a joystick, and details are not repeated herein.

Further, the touch panel 8071 may cover the display panel 8061. After the touch panel 8071 detects a touch operation on or near it, the touch panel 8071 sends the touch operation to the processor 810 to determine a type of the touch event. Then, the processor 810 provides corresponding visual output on the display panel 8061 according to the type of the touch event. Although in FIG. 8, the touch panel 8071 and the display panel 8061 are used as two separate components to implement an input function and an output function of the mobile terminal, in some embodiments, the touch panel 8071 may be integrated with the display panel 8061 to implement the input function and the output function of the mobile terminal, which is not specifically limited herein.

The interface unit 808 is an interface for connecting an external device to the mobile terminal 800. For example, the external device may include a port for wired or wireless headsets, a port for an external power supply (or a battery charger), a port for wired or wireless data, a port for a memory card, a port for connecting a device with an identification module, an audio input/output (I/O) port, a video I/O port, and an earphone port. The interface unit 808 may be used to receive input (e.g., data information and power) from the external device and transmit the received input to one or more elements of the terminal device 800, or may be used to transmit data between the terminal device 800 and the external device.

The memory 809 may be used to store software programs and various data. The memory 809 may mainly include a program storage region and a data storage region. The program storage region may store an operating system and application programs that are required by at least one function (e.g., a sound playing function or an image playing function). The storage data region may store data (e.g., audio data and a phonebook) created according to the use of a mobile phone. In addition, the memory 809 may include a high-speed random access memory, and may further include a non-volatile memory, such as at least one magnetic disk storage device, a flash memory device, or other volatile solid-state storage devices.

The processor 810 is a control center of the mobile terminal. The processor 180 is used to connect various parts of the entire mobile terminal through various interfaces and wires, and realize various functions of the mobile terminal and process data through running or executing software programs and/or modules stored in the memory 809 and invoking data stored in the memory 809, thereby monitoring the mobile terminal entirely. The processor 810 may include one or more processing units. Optionally, an application processor and a modem processor may be integrated into the processor 810. The application processor is mainly responsible for the operating system, user interfaces and application programs, and the modem processor is mainly responsible for wireless communication. It will be understood that, the modem processor may not be integrated into the processor 810.

The mobile terminal 800 may further include the power supply 811 (e.g., a battery) for supplying power to various components (loads). Optionally, the power supply 811 may be logically connected to the processor 810 through a power management system, so that functions such as charging management, discharging management and power consumption management are achieved through the power management system. The power supply 811 includes any one of the multi-battery charging and discharging devices provided in the foregoing embodiments of the present disclosure, or there is at least one power supply 811 modified and implemented based on any one of the multi-battery charging and discharging devices provided by the foregoing embodiments of the present disclosure.

In addition, the mobile terminal 800 includes some functional modules that are not shown, which will not be repeated herein.

It will be noted that, similar reference signs and letters indicate similar items in the following figures. Therefore, once a certain item is defined in a figure, it need not be further defined or explained in subsequent figures.

In the description of the present disclosure, it will be noted that, orientations or positional relationships indicated by the terms such as "center," "upper," "lower," "left," "right," "vertical," "horizontal," "inner" and "outer" are based on orientations or positional relationships shown in the accompanying drawings. These terms are used merely to facilitate and simplify the description of the present disclosure, but not to indicate or imply that the indicated device or element must have a specific orientation, or must be constructed and operated in a specific orientation. Therefore, these terms cannot be construed as limitations on the present disclosure. In addition, the terms such as "first", "second" and "third" are used merely to distinguish between descriptions and cannot be construed as indicating or implying relative importance.

In the description of the present disclosure, it will also be noted that, the terms such as "provided," "mounted," "connected" and "connecting" should be understood in a broad sense unless specifically defined or limited. For example, it may be a permanent connection, a detachable connection, or an integrated connection; it may be a mechanical connection or an electrical connection; and it may be a direct connection, an indirect connection through an intermediate medium, or an internal connection between two elements. A person of ordinary skill in the art may understand specific meanings of the above terms in the present disclosure as the case may be.

Finally, it will be noted that, the embodiments of the present disclosure have been described above with reference to the accompanying drawings to describe the technical solutions in the present disclosure, but the present disclosure is not limited to the above specific implementations, and the protection scope of the present disclosure is not limited thereto. The above specific implementations are merely illustrative and not restrictive. Although the present disclosure has been described in detail with reference to the foregoing embodiments, a person of ordinary skill in the art will understand that, any technician familiar with the technical field may still make modifications or easily conceive of changes to the technical solutions described in the foregoing embodiments, or make equivalent substitutions for some technical features, within the technical scope of the present disclosure. These modifications, changes or substitutions do not cause essence of corresponding technical solutions to depart from the scope of the technical solutions in the embodiments of the present disclosure, and shall be included in the protection scope of the present disclosure. Therefore, the protection scope of the present disclosure shall be subject to the protection scope of the claims.

What is claimed is:

1. A multi-battery charging and discharging device, comprising a power management integrated circuit (PMIC) module, at least two rechargeable batteries, and a plurality of first field-effect transistors; wherein
   each rechargeable battery is connected to a pulse width modulation (PWM) power module of the PMIC module through a field-effect switching transistor, terminals for connecting field-effect switching transistors and the PWM power module are separated from each other; and
   each of the first field-effect transistors is provided in a connection path between a rechargeable battery and a load, and the first field-effect transistor is used to control the connection path between the rechargeable battery and the load to be turned on or turned off.

2. The device according to claim 1, further comprising a charging control module, wherein
   an input of the charging control module is connected to a charging interface that is used to connect an external power supply, and an output of the charging control module is connected to the rechargeable battery; and
   the charging control module is used to acquire electric energy provided by the external power supply through the charging interface, and transmit the electric energy to the rechargeable battery to charge the rechargeable battery.

3. The device according to claim 2, further comprising a plurality of second field-effect transistors, wherein
   each of the second transistors is provided in a connection path between a rechargeable battery and the charging control module; and
   the second field-effect transistor is used to control the connection path between the rechargeable battery and the charging control module to be turned on or turned off.

4. The device according to claim 1, wherein the first field-effect transistor includes a switching diode and a P-channel field-effect transistor;
   a positive terminal of the switching diode is connected to a drain of the P-channel field-effect transistor, and a negative terminal of the switching diode is connected to a source of the P-channel field-effect transistor; and
   in a case where a voltage difference between the positive terminal and the negative terminal of the switching diode is greater than a forward turn-on voltage, the first field-effect transistor is in a turn-on state; and in a case where the difference between the voltage of the positive terminal and the voltage of the negative terminal of the switching diode is not greater than the forward turn-on voltage, the first field-effect transistor is in a turn-off state.

5. The device according to claim 2, wherein the charging control module is connected to the PMIC module;
   the charging control module is used to acquire an electrical signal of the charging interface, determine whether the charging interface is connected to the external power supply according to the electrical signal, and send a charging start command to the PMIC module after determining that the charging interface is connected to the external power supply; and the PMIC module is used to control the field-effect switching transistor to switch to a turn-on state after receiving the charging start command, and transmit the electric energy of the external power supply to the rechargeable battery to charge the rechargeable battery.

6. The device according to claim 3, wherein the charging control module is further used to acquire a voltage signal of each rechargeable battery, and control a charging voltage transmitted to the rechargeable battery according to a current voltage value corresponding to each voltage signal; and the charging voltage is greater than a first voltage value and less than a second voltage value, or equal to a specified voltage value; the first voltage value is a sum of a minimum value in current voltage values and a forward turn-on voltage of the second field-effect transistor, the second voltage value is a sum of a target value in the current voltage values and the forward turn-on voltage of the second field-effect transistor, and the target value is a voltage value that is first greater than the minimum value by a preset threshold.

7. The device according to claim 6, wherein the charging control module includes a plurality of charging ICs and a microprocessor MCU; wherein each charging IC is connected to a rechargeable battery through a second field-effect transistor;

the microprocessor MCU is used to acquire the voltage signal of each rechargeable battery, and determine, according to the current voltage value corresponding to each voltage signal, whether there is a voltage value greater than the minimum value by the preset threshold;

if yes, the microprocessor MCU is used to determine the minimum value and the target value that is first greater than the minimum value by the preset threshold, and to determine a voltage greater than the first voltage value and less than the second voltage value as the charging voltage of the rechargeable battery;

if not, the microprocessor MCU is used to determine the specified voltage value as the charging voltage of the rechargeable battery, and transmits a control command carrying the determined charging voltage to the charging IC;

the charging IC is used to control the charging voltage transmitted to the rechargeable battery according to the control command; and the second field-effect transistor is used to control a connection path between a rechargeable battery and a charging IC to be turned on or turned off.

8. The device according to claim 1, wherein a drain of the first field-effect transistor is connected to the rechargeable battery, a source of the first field-effect transistor is connected to the load, and a gate of the first field-effect transistor is grounded.

9. The device according to claim 3, wherein a drain of the second field-effect transistor is connected to the charging control module, a source of the second field-effect transistor is connected to the rechargeable battery, and a gate of the second field-effect transistor is grounded.

10. A mobile terminal, comprising:

at least one load; and the multi-battery charging and discharging device according to claim 1, wherein the multi-battery charging and discharging device is used to supply power to the at least one load.

* * * * *

UNITED STATES PATENT AND TRADEMARK OFFICE
CERTIFICATE OF CORRECTION

PATENT NO. : 11,336,105 B2
APPLICATION NO. : 17/156845
DATED : May 17, 2022
INVENTOR(S) : Shiwen Xiao It is certified that error appears in the above-identified patent and that said Letters Patent is hereby corrected as shown below:

On the Title Page

After Item (63), insert:
-- (30) Foreign Application Priority Data
Jul. 25, 2018   (CN) ..................... 201810826095.0 --

Signed and Sealed this
Thirtieth Day of August, 2022

Katherine Kelly Vidal
*Director of the United States Patent and Trademark Office*